United States Patent
Freedman et al.

(10) Patent No.: US 11,204,503 B2
(45) Date of Patent: Dec. 21, 2021

(54) METHOD AND SYSTEM FOR LARGE FIELD OF VIEW DISPLAY WITH SCANNING MIRROR HAVING OPTICAL POWER

(71) Applicant: Magic Leap, Inc., Plantation, FL (US)

(72) Inventors: Barak Freedman, Binyamina (IL); Asaf Pellman, Bet-Yehoshua (IL); Ori Weinstein, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/898,380

(22) Filed: Jun. 10, 2020

(65) Prior Publication Data
US 2020/0301151 A1  Sep. 24, 2020

Related U.S. Application Data

(63) Continuation of application No. 16/262,659, filed on Jan. 30, 2019, now Pat. No. 10,712,570.
(Continued)

(51) Int. Cl.
*G02B 27/01* (2006.01)
*G02B 27/30* (2006.01)
(Continued)

(52) U.S. Cl.
CPC ......... *G02B 27/0172* (2013.01); *G02B 6/122* (2013.01); *G02B 26/101* (2013.01);
(Continued)

(58) Field of Classification Search
CPC ............... G02B 26/101; G02B 26/121; G02B 27/0081; G02B 27/0172; G02B 27/30;
(Continued)

(56) References Cited

U.S. PATENT DOCUMENTS

| 6,714,331 | B2 | 3/2004 | Lewis et al. |
| 10,712,570 | B2 * | 7/2020 | Freedman ............... G02B 6/122 |

(Continued)

FOREIGN PATENT DOCUMENTS

| AU | 2019214951 | 6/2020 |
| CA | 3086542 | 8/2019 |

(Continued)

OTHER PUBLICATIONS

U.S. Appl. No. 16/262,659, "Non-Final Office Action", dated Dec. 31, 2019, 18 pages.
(Continued)

*Primary Examiner* — Stacy Khoo
(74) *Attorney, Agent, or Firm* — Kilpatrick Townsend & Stockton LLP (57) ABSTRACT

An image display system can include a plurality of light sources configured to emit uncollimated light, and an eyepiece waveguide having an input port configured to receive beams of light at differing angles. The image display system also includes a scanning mirror having a surface with positive optical power configured to receive light emitted by the plurality of light sources. The surface with positive optical power is configured to collimate light emitted by the plurality of light sources to form a plurality of collimated light beams and direct the plurality of collimated light beams to the input port.

20 Claims, 10 Drawing Sheets

Related U.S. Application Data (60) Provisional application No. 62/624,762, filed on Jan. 31, 2018.

(51) Int. Cl.
*G06F 3/01* (2006.01)
*G02B 6/122* (2006.01)
*G06T 19/00* (2011.01)
*G02B 26/12* (2006.01)
*G02B 27/00* (2006.01)
*G02B 26/10* (2006.01)

(52) U.S. Cl.
CPC ....... *G02B 26/121* (2013.01); *G02B 27/0081* (2013.01); *G02B 27/30* (2013.01); *G06F 3/013* (2013.01); *G06T 19/006* (2013.01); *G02B 2027/0178* (2013.01)

(58) Field of Classification Search
CPC . G02B 6/122; G02B 2027/0178; G06F 3/013; G06T 19/006
See application file for complete search history.

(56) References Cited

U.S. PATENT DOCUMENTS

| | | | |
|---|---|---|---|
| 10,795,160 B1* | 10/2020 | Stanley | G02B 27/0172 |
| 2002/0030636 A1 | 3/2002 | Richards | |
| 2010/0079865 A1 | 4/2010 | Saarikko et al. | |
| 2010/0201953 A1 | 8/2010 | Freedman et al. | |
| 2011/0134017 A1* | 6/2011 | Burke | G02B 27/0101 345/32 |
| 2014/0300966 A1* | 10/2014 | Travers | G03H 1/2205 359/558 |
| 2015/0248015 A1* | 9/2015 | Schwedt | G02B 21/0092 359/226.1 |
| 2016/0212394 A1* | 7/2016 | Nakahara | G02B 26/101 |
| 2017/0248790 A1 | 8/2017 | Cheng | |
| 2017/0339398 A1* | 11/2017 | Woodgate | G02B 30/24 |
| 2019/0235252 A1 | 8/2019 | Freedman et al. | |

FOREIGN PATENT DOCUMENTS

| | | |
|---|---|---|
| CN | 111656249 | 9/2020 |
| EP | 3746834 | 12/2020 |
| EP | 3746834 | 3/2021 |
| IN | 202047024935 | 7/2020 |
| JP | 2021512351 | 5/2021 |
| KR | 20200111190 | 9/2020 |
| WO | 2014209431 A1 | 12/2014 |
| WO | 2019152538 | 8/2019 |

OTHER PUBLICATIONS

U.S. Appl. No. 16/262,659, "Notice of Allowance", dated Mar. 11, 2020, 11 pages.

EP19746976.0, "Extended European Search Report", dated Feb. 19, 2021, 6 pages.

PCT/US2019/015879, "International Preliminary Report on Patentability", dated Aug. 13, 2020, 8 pages.

PCT/US2019/015879, "International Search Report and Written Opinion", dated Apr. 26, 2019, 9 pages.

\* cited by examiner

FIG. 10

METHOD AND SYSTEM FOR LARGE FIELD OF VIEW DISPLAY WITH SCANNING MIRROR HAVING OPTICAL POWER

CROSS-REFERENCES TO RELATED APPLICATIONS

This application is a continuation of U.S. patent application Ser. No. 16/262,659, filed on Jan. 30, 2019, now U.S. Pat. No. 10,712,570, issued on Jul. 14, 2020, entitled "METHOD AND SYSTEM FOR LARGE FIELD OF VIEW DISPLAY WITH SCANNING MIRROR HAVING OPTICAL POWER," which is a non-provisional of and claims the benefit of and priority to U.S. Provisional Patent Application No. 62/624,762, filed on Jan. 31, 2018, entitled "METHOD AND SYSTEM FOR LARGE FIELD OF VIEW DISPLAY WITH SCANNING MIRROR HAVING OPTICAL POWER," which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. The image can be displayed using image frames or raster scanned images. In a scanning image display system, each angle (or small angular range of the scan) of the light beams defines the pixels of the image. By scanning the mirrors in two orthogonal axes, a two-dimensional field of view (FOV) can be created. Scanned beams can be coupled through glasses lenses that take the form of waveguide displays. The image display systems can be mounted on each of the left and right sides of the glasses frames.

One drawback of scanned beam displays is that there is generally a tradeoff between scan frequency, which determines the product of resolution and frame rate on the one hand and, on the other hand, scan angular range which determines the angular field of view. Additionally, certain compact laser diodes that have a size suitable for incorporation in augmented reality glasses have a maximum modulation rate which again limits the product of resolution and frame rate.

SUMMARY OF THE INVENTION

Conventional scanning image displays in a wearable device for virtual reality or augmented reality applications often have a limited field of view, because the scanning mirror has limited range of scan motion and design constraints in the arrangement of optical elements. Embodiments of the present invention provide scanning image display systems with a large field of view and high resolution while maintaining a small device form factor. In some embodiments, the larger field of view can be achieved by scanning multiple incoming light beams at the same time and combining the individual fields of view into a larger composite field of view.

According to some embodiments of the invention, an image display system includes a scanning mirror for receiving two or more incoming diverging pencils of light and providing a plurality of reflected light beams. Each of the plurality of reflected light beams is configured to provide an image in a respective field of view. The image display system also includes a waveguide having an input coupling optical element and an output coupling optical element. The input coupling optical element is configured for coupling the plurality of reflected light beams into the waveguide. The output coupling optical element is configured for projecting a plurality of output light beams from the waveguide to form a projected image in a composite field of view.

According to some embodiments of the invention, an image display can include an eyepiece waveguide including an input port configured to receive beams of light at differing angles, and a plurality of point light sources positioned proximate the input port. Each of the plurality of point light sources can have an emission direction oriented away from the input port. The image display can also have a scanning mirror having a surface with positive optical power. The scanning mirror can be positioned proximate the input port and positioned to intercept light emitted by the plurality of point light sources. The surface with positive optical power can be configured to collimate light emitted by the plurality of point light sources and reflect light emitted by the plurality of point light sources to the input port.

In an embodiment of the above image display, the surface with positive optical power can include a Fresnel reflector.

In another embodiment of the above image display, the surface with positive optical power can include a concave mirror.

In some embodiments, the surface with positive optical power of the scanning mirror is configured to form a plurality of collimated light beams and direct the plurality of collimated light beams to the input port. Each of the plurality of collimated light beams is configured to illuminate a portion of a composite field of view (FOV) through the eyepiece waveguide.

In certain embodiments, the waveguide display includes an integrated optical waveguide chip that includes a plurality of optical waveguides, and at least a subset of the plurality of optical waveguides include light emission ends. The light emission ends form a point light source.

In certain embodiments, the integrated optical waveguide chip is disposed between the scanning mirror and the input port.

In certain embodiments, the integrated optical waveguide chip is disposed in at least partly overlapping relation over the input port.

In certain embodiments, the integrated optical waveguide chip is configured to receive light from multiple sets of {R, G, B} laser diodes.

In certain embodiments, the eyepiece waveguide also includes an orthogonal pupil expander and an exit pupil expander.

In certain embodiments, the eyepiece waveguide includes at least one major surface and the input port, and the orthogonal pupil expander and the exit pupil expander include surface relief gratings disposed on the at least one major surface.

In certain embodiments, the integrated optical waveguide chip and the scanning mirror are disposed on a common side of the major surface.

In certain embodiments, augmented reality glasses can include the waveguide displays described above.

According to some embodiments of the invention, an image display system can include a plurality of light sources configured to emit uncollimated light, and an eyepiece waveguide having an input port configured to receive beams of light at differing angles. The image display system also includes a scanning mirror having a surface with positive optical power configured to receive light emitted by the plurality of light sources. The surface with positive optical power is configured to collimate light emitted by the plurality of light sources to form a plurality of collimated light beams and direct the plurality of collimated light beams to the input port.

In an embodiment of the above image display system, the surface with positive optical power includes a concave mirror.

In another embodiment, the surface with positive optical power includes a Fresnel reflector.

In certain embodiments, the image display system also has an integrated optical waveguide chip that includes a plurality of optical waveguides. At least a subset of the plurality of optical waveguides includes light emission ends that form the plurality of light sources.

In certain embodiments, the integrated optical waveguide chip is disposed in at least partly overlapping relation over the input port.

In certain embodiments, the integrated optical waveguide chip is configured to receive light from multiple sets of {R, G, B} laser diodes.

In another embodiment, a plurality of light sources are configured to emit uncollimated light in different directions, wherein each of the plurality of collimated light beams formed by the scan mirror with positive optical power is configured to illuminate a portion of a composite field of view (FOV) through the eyepiece waveguide.

According to some embodiments of the invention, a method for displaying an image in a waveguide display includes emitting light from a plurality of point light sources. Each of the plurality of point light sources can have a different emission direction. The method also includes intercepting light emitted by the plurality of point light sources at a scanning mirror having a surface with positive optical power. The surface with positive optical power is configured to collimate light emitted by the plurality of point light sources to produce a plurality of collimated light beams. The method also includes receiving the plurality of collimated light beams from the scanning mirror in an input port of an eyepiece waveguide, and forming a virtual image from an output port of the eyepiece waveguide.

In an embodiment of the above method, the surface with positive optical power includes a concave mirror.

In another embodiment, the surface with positive optical power includes a Fresnel reflector.

In another embodiment, each of the plurality of collimated light beams is configured to illuminate a portion of a composite field of view (FOV) through the eyepiece waveguide.

Each of the plurality of reflected collimated light beams is configured to provide an image in a respective field of view (FOV). The plurality of reflected collimated light beams is received in the eyepiece waveguide, and the eyepiece waveguide projects a plurality of output light beams from the eyepiece waveguide to form a projected image in a composite field of view (FOV). In some embodiments of the method, the composite field of view is larger than the FOV provided by each of the plurality of point light sources. The image in the composite FOV can be a tiled image including the images from each of the plurality of point light sources.

In another embodiment, the plurality of point light sources are included in an integrated optical waveguide chip overlying the input port of the eyepiece waveguide and the scanning mirror is disposed overlying the integrated optical waveguide chip. The plurality of collimated light beams from the scanning mirror is transmitted through the integrated optical waveguide chip to the input port of the eyepiece waveguide.

In another embodiment, the integrated optical waveguide chip is disposed between the scanning mirror and the input port.

In another embodiment, the integrated optical waveguide chip is configured to receive light from multiple sets of {R, G, B} laser diodes.

In some embodiments, forming the image from an output port of the eyepiece waveguide comprises outputting light from the output port of the eyepiece waveguide forming a virtual image.

Additional features, benefits, and embodiments are described below in the detailed description, figures, and claims.

DETAILED DESCRIPTION OF THE INVENTION

Embodiments of the present invention are directed to image display systems and methods for a wearable device that can provide a larger field of view (FOV) than conventional display systems.

Figure 1:
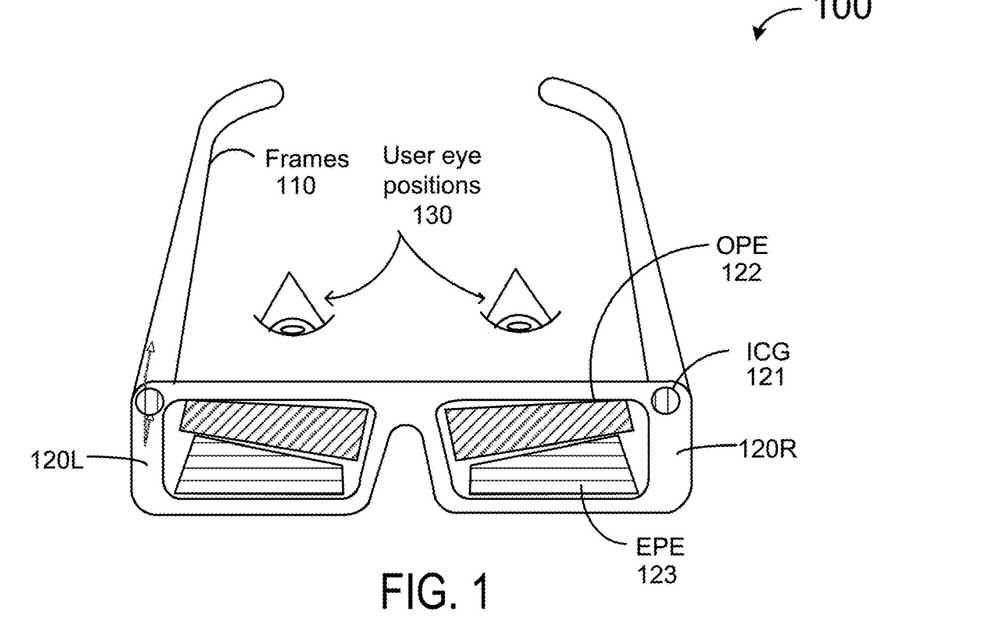
FIG. 1 is a perspective view diagram illustrating a perspective view of an exemplary wearable display device according to some embodiments.

FIG. 1 is a perspective view diagram illustrating a perspective view of an exemplary wearable display device 100 according to some embodiments. In this example, wearable display device 100 can be a pair of glasses for augmented reality applications. As shown in FIG. 1, wearable display device 100 can include frames 110 supporting a left eyepiece 120L and a right eyepiece 120R. Each eyepiece 120L and 120R can be an eyepiece waveguide and can include an input coupling grating (ICG) 121, an orthogonal pupil expander (OPE) 122, and an exit pupil expander (EPE) 123. The input coupling grating (ICG) 121, orthogonal pupil expander (OPE) 122, and exit pupil expander (EPE) 123 can be suitable diffractive optical elements (DOEs). For example, they can take the form of gratings formed on an optical waveguide. According to certain embodiments, rather than providing a single waveguide for each eyepiece, each eyepiece can have a stack of multiple optical waveguides, for different colors and with different optical power EPEs. The EPEs are configured to project images that can be viewed from the user eye positions 130.

In FIG. 1, incoming light, which can be image light or a scanning light beam, can be incident upon the ICG (121) of each eyepiece 120L and 120R. The ICG 107 couples the incoming light into a guided mode propagating in a direction toward the OPE region 122. The eyepiece propagates the image light by total internal reflection (TIR). The OPE region 122 of each eyepiece 120L and 120R can also include a diffractive element that couples and redirects a portion of the image light propagating in the eyepiece 120L and 120R toward the EPE region 123. The EPE region 123 includes a diffractive element that couples and directs a portion of the light propagating in each eyepiece 120L and 120R in a direction outward from the plane of the eyepiece layer 120 toward the viewer's eyes in positions 130. In this fashion, an image may be viewed by the viewer.

The incoming light may include light in the three primary colors, namely blue (B), green (G), and red (R).

In some applications, the eyepiece can accept collimated light which is scanned in two degrees of freedom. Each instantaneous angle of incidence (or small range of angle of incidence) corresponds to an angularly defined pixel. In some embodiments, the light can be configured to simulate a virtual object, which can appear to be half a meter to a meter away from the viewer.

Figure 2:
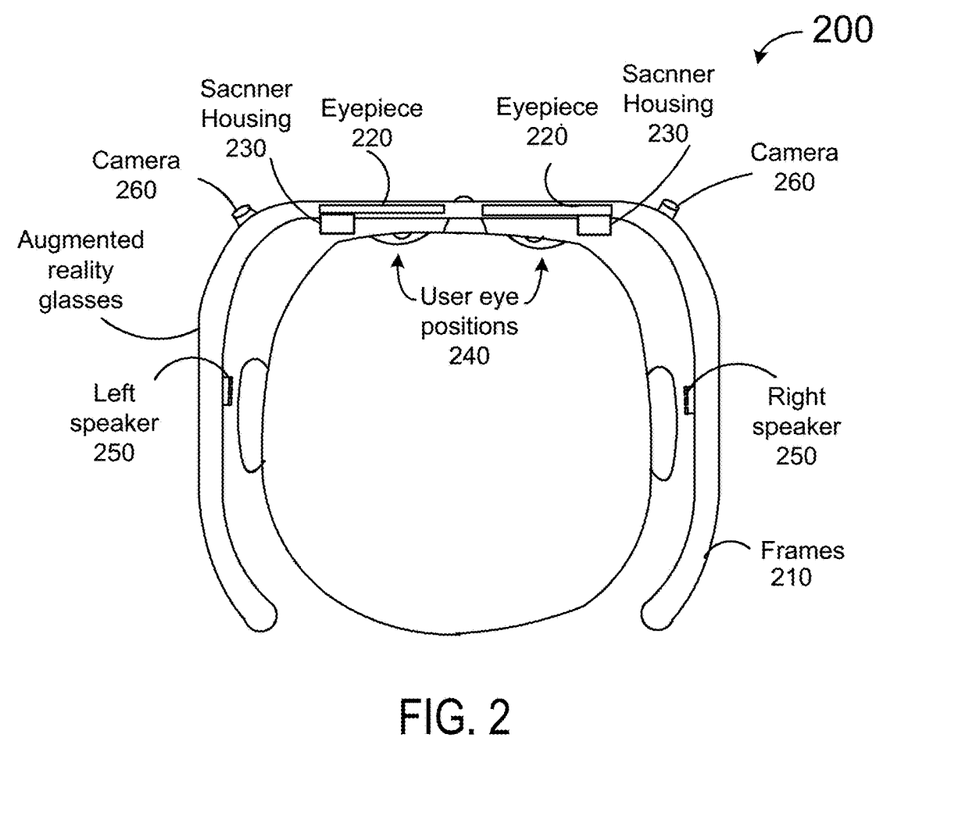
FIG. 2 is a top view of an exemplary wearable display device according to some embodiments.

FIG. 2 is a top view of an exemplary wearable display device 200 according to some embodiments. In this example, wearable display device 200 can be a pair of glasses for augmented reality applications. As shown in FIG. 2, wearable display device 200 can include frames 210 and eyepieces 220. Each eyepiece can be similar to eyepieces 120L and 120R in FIG. 1 and can include an ICG, an OPE, and an EPE, which are not visible in the top view. Wearable display device 100 also includes scanner housings 230, which can include a scanning mirror for forming a virtual image (e.g., at infinity) from incoming light sources. In some embodiments, the ICGs are used as input ports for receiving light. The images formed by the eyepiece can be viewed from user eye positions 240. The augmented reality glasses can also have left and right speakers 250 and cameras 260.

Figure 3A:
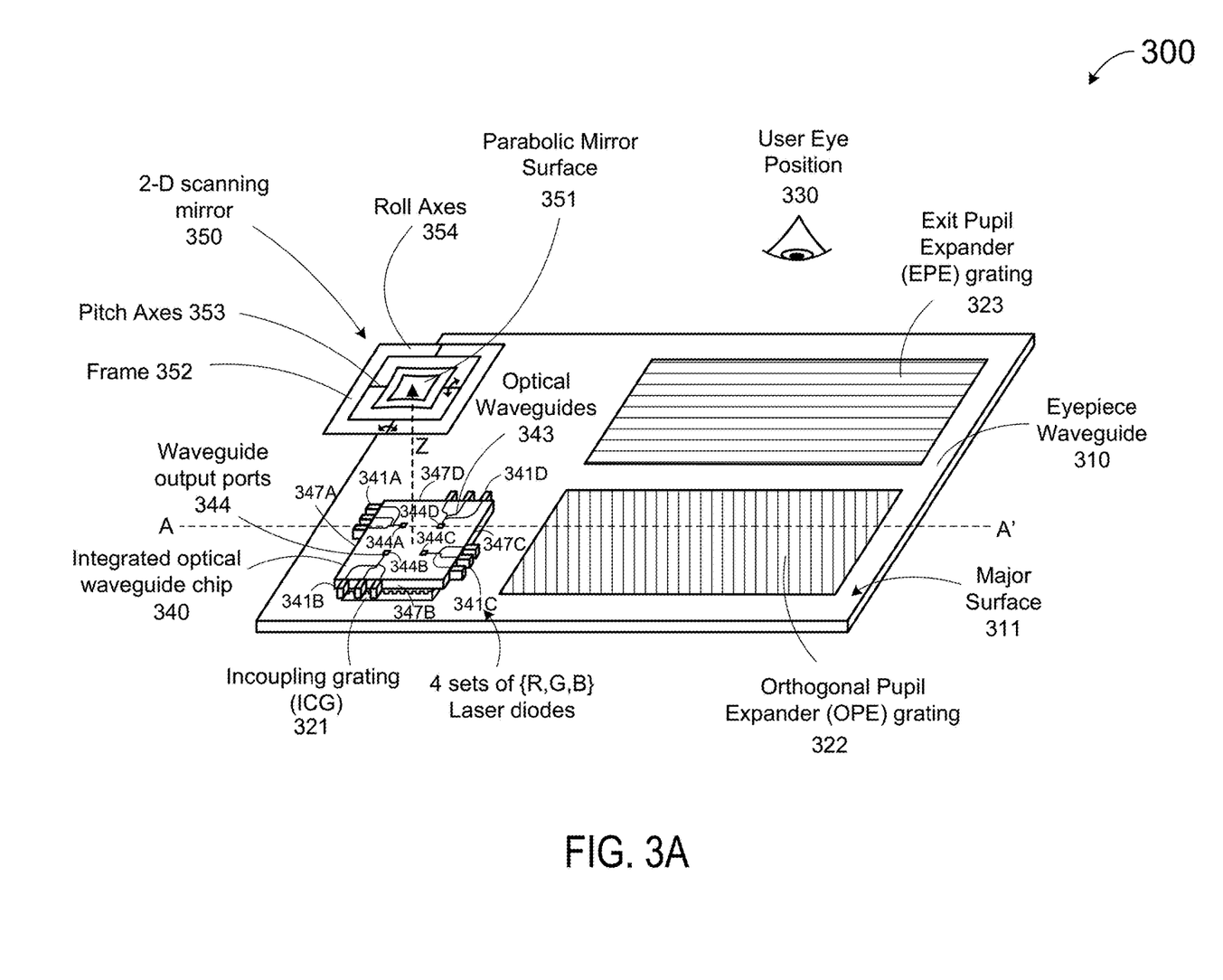
FIG. 3A is a perspective view of a waveguide display that may be used as an eyepiece of the wearable display device shown in FIGS. 1-2 according to some embodiments.
Figure 3B:
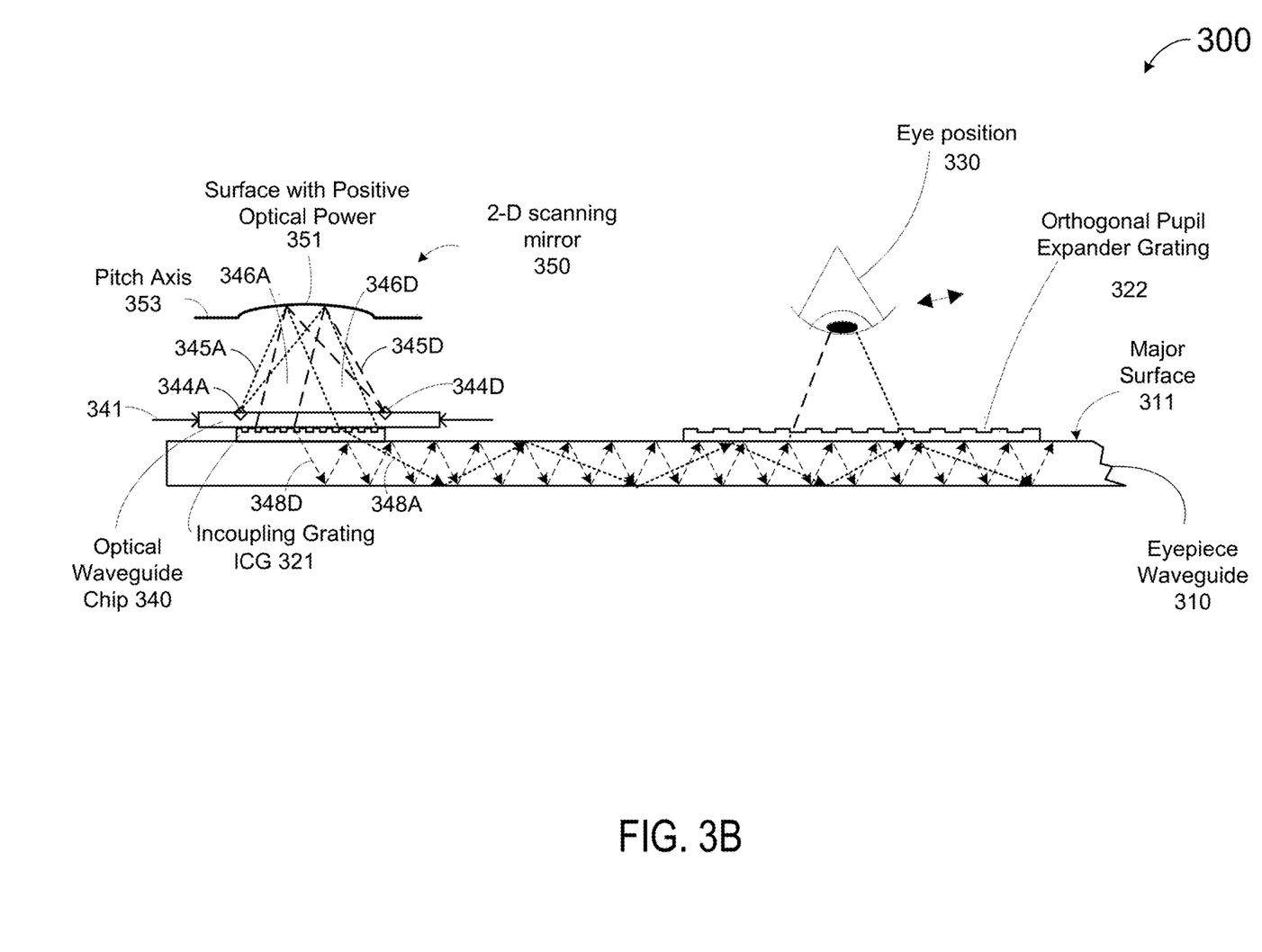
FIG. 3B is a cross-sectional view of a waveguide display according to some embodiments.

FIG. 3A is a perspective view of a waveguide display 300 according to some embodiments, and FIG. 3B is a cross-sectional view of a waveguide display 300 according to some embodiments. Waveguide display 300 can include an eyepiece waveguide 310, which can be used as eyepieces 120L and 120R of the augmented reality glasses illustrated in FIG. 1 or 2. As shown in FIG. 3A, eyepiece waveguide 310 can have an input coupling grating (ICG) 321, an orthogonal pupil expander (OPE) 322, and an exit pupil expander (EPE) 323. The input coupling grating (ICG) 321, orthogonal pupil expander (OPE) 322, and exit pupil expander (EPE) 323 can take the form of gratings formed on the optical waveguide. Each eyepiece can have a stack of multiple optical waveguides, for different colors and with different optical power EPEs. The EPEs are configured to project images that can be viewed from the user eye position 330.

In some embodiments, eyepiece waveguide 310 in waveguide display 300 can have input ports configured to receive beams of light at differing angles. In FIG. 3A, the input port is shown as incoupling grating (ICG) 321. As shown in FIG. 3A, the plurality of point light sources can be provided by an integrated optical waveguide chip 340. In this example, an integrated optical waveguide chip 340 can receive light from four sets of red, green, and blue (RGB) laser diodes 341A, 341B, 341C, and 341D including a first set of RGB laser diodes 341A, a second set of RGB laser diodes 341B, a third set of RGB laser diodes 341C and a fourth set of RGB laser diodes 341D. In the embodiment as shown the four sets of the RGB laser diodes 341A, 341B, 341C, and 341D are respectively arranged on a first side 347A, a second side 347B, a third side 347C and a fourth side 347D of the integrated optical waveguide chip. In some embodiments, integrated optical waveguide chip 340 can include the laser diodes. In other embodiments, integrated optical waveguide chip 340 can be coupled to external laser diodes. Integrated optical waveguide chip 340 can also have multiple optical waveguides 343 for directing light from the RGB laser diodes to one of four output ports 344A, 344B, 344C, and 344D, which can serve as point light sources.

In FIG. 3A, waveguide display 300 can also include a two-dimensional (2-D) scanning mirror 350 having a surface with positive optical power, e.g., parabolic mirror 351, positioned proximate the input port (ICG 321) and positioned to intercept light emitted by the plurality of point light sources. The surface with positive optical power is configured to collimate light emitted by the plurality of point light sources and reflect light emitted by the plurality of point light sources back to the input port (ICG 321).

In some embodiments, such as shown below in FIG. 3B, integrated optical waveguide chip 340 can be disposed immediately above ICG 321, and scanning mirror 350 is disposed at a short distance above integrated optical waveguide chip 340, such that scanning mirror 350 is disposed proximate the input port (ICG 321).

As shown in FIG. 3A, scanning mirror 350 can include a two-dimensional scanning mirror, e.g., a parabolic mirror surface 351, mounted on a frame 352 with a pitch axis 353 and a roll axis 354. The mirror can be configured to rotate in the pitch and roll directions, forming a 2-D scanner. In some embodiments, the mirror can have an outer frame with outer pivot points, and an inner frame with a second set of pivot points. The driving mechanism is not shown explicitly in FIG. 3A. For example, the scanning mirror 350 can be driven by electromagnetic force, for example, by a coil in a magnetic field, or by interdigitated finger Microelectromechanical System (MEMS) electrostatic drives.

The scanning mirror 350 can be a mirror with positive optical power. In the field of optics, the term optical power (also referred to as dioptric power, refractive power, focusing power, or convergence power) is the degree to which a lens, mirror, or other optical system converges or diverges light. It is equal to the reciprocal of the focal length of the device: P=1/f. High optical power corresponds to short focal length. Converging lenses have positive optical power, while diverging lenses have negative optical power. For example, the scanning mirror can be a curved mirror, a parabolic mirror, a spherical mirror approximating a parabolic mirror, an aspheric mirror, or the like. Mirrors of other shapes can be formed using optical design methods for optimization.

Alternatively, the curved mirror can be a scanning Fresnel reflector, which can include multiple sections. For example, a circular Fresnel lens or reflector can have a set of concentric annular sections. Depending on the application, a Fresnel lens can include reflective and refractive sections.

The scanning mirror with positive optical power, e.g. a parabolic mirror, can be made using traditional optical fabrication methods, grayscale lithography or electroforming, for example. In some embodiments, a Fresnel lens or Fresnel reflector can also be made using grayscale lithography, or micro printing, for example.

The scanning mirror movement may be resonant in one degree of freedom and quasi-statically controlled in a second degree of freedom. For example the resonant axis may correspond to a movement analogous to movement along lines of a display and the quasi-statically controlled second degree of freedom may correspond to movement analogous to vertical movement between lines of a display. In one possible case, the resonant axis may be the pitch axis and the quasi-statically controlled axis may be the yaw axis. For relatively high resolution imagery, it is desirable to have the equivalent of 1000 or 2000 scan lines, for example, and a frame refresh rate of 30 to 60 frames per second. Such parameters call for a line rate of 30 KHz to 120 KHz. For small MEMS scanners that are small enough to be included in augmented reality wearables, there is generally a tradeoff between the angular range of the resonant axis, which relates to the field of view (FOV), and the resonant frequency, which equates to the line rate. Image formation using the scanning mirror with the eyepiece 310 is explained further below with reference to FIGS. 3B and 3C.

FIG. 3B is a cross-sectional view of a portion of waveguide display 300 of FIG. 3A according to some embodiments. FIG. 3B illustrates a cross-sectional view of waveguide display 300 along a cut line A-A' in FIG. 3A. In the cross section of FIG. 3B, the input coupling grating (ICG) 321 and the orthogonal pupil expander (OPE) 322 are visible. The EPE is disposed behind the plane of the drawing sheet in FIG. 3B and hence is not visible.

In FIG. 3B, the plurality of point light sources can be provided by output ports 344A, 344B, 344C, 344D of an integrated optical waveguide chip 340, which is disposed over the ICG 321. In this example, integrated optical waveguide chip 340 can receive incoming light from four sets of red, green, and blue (RGB) laser diodes. As shown in FIG. 3A, integrated optical waveguide chip 340 can also have multiple optical waveguides for directing light from the RGB laser diodes 341A, 341B, 341C, and 341D to one of four output ports 344A, 344B, 344C, and 344D. In the cross-sectional view of FIG. 3B only one set of RGB laser diodes 341A and two output ports 344A and 344D are visible.

As shown in FIG. 3B, the waveguide display 300 can also include a 2-D scanning mirror 350 with a scanning mirror 350 having a surface 351 with positive optical power. Scanning mirror 350 can be a two-dimensional scanning mirror, e.g., a parabolic mirror, configured to rotate in two dimensions with a pitch axis 353 and a roll axis 354 (not shown). The scanning mirror 350 is positioned above the optical waveguide chip 340 and configured to intercept light 345A and 345D emitted by the plurality of point light sources at the output ports 344A and 344D of the optical waveguide chip 340. The light 345A and 345D emitted by the plurality of point light sources may be uncollimated. The scanning mirror surface with positive optical power, e.g., a parabolic mirror, is configured to collimate light emitted by the plurality of point light sources and reflect light the collimated light to the input port (ICG 321). FIG. 3B shows that uncollimated light from the optical waveguide chip 340 is reflected from the scanning mirror as collimated light. In FIG. 3B, two output ports, 344A and 344D, along the A-A' cut line in FIG. 3A are shown. Light rays originated from output port 344A are shown as dotted lines, and light rays originated from output 344D are shown as dashed lines. The uncollimated light from output port 344A is reflected from scanning mirror 350 as collimated light 346A, and the uncollimated light from output port 344D is reflected from scanning mirror 350 as collimated light 346D.

The collimated light (346A and 346D) from the scanning mirror is incoupled by the ICG 321 into eyepiece waveguide 310. Eyepiece waveguide 310 can have a stack of multiple optical waveguides for different colors. Incoupled light (348A and 348D) propagates in eyepiece waveguide 310 by total internal reflection, and then outcoupled to orthogonal pupil expanders (OPEs), and in turn coupled to exit pupil expanders (EPEs), which are not visible in FIG. 3B. The EPEs are configured to project images that can be viewed from the user eye positions 330.

The waveguide chip 340 can include optical waveguides built in a substrate. For example, the substrate can be a glass slab. The substrate can also be made with other materials, such as a polymer material or a semiconductor material, etc. An optical waveguide is an elongated structure configured for guiding light by restricting the spatial region in which light can propagate. Light can propagate by total internal reflection in regions having different refractive indices, which can be formed with different materials, e.g., dielectric materials with different dielectric constants, or by different impurity doping. Waveguides may be defined in the glass slab by patternwise doping with a dopant that changes the index of refraction of the glass.

In some embodiments, as shown in FIGS. 3A and 3B, the eyepiece waveguide 310 includes at least one major surface 311. The input port 321, the orthogonal pupil expander 322, and the exit pupil expander 323 include surface relief gratings disposed on the at least one major surface 311. In the embodiment of FIGS. 3A and 3B, the integrated optical waveguide chip 340 and the scanning mirror 350 are disposed on a common side of the major surface. In some embodiments, the integrated optical waveguide chip 340 is disposed between the scanning mirror 350 and the input port 321. In some embodiments, the integrated optical waveguide chip 340 is disposed in at least partly overlapping relation over the input port 321.

Figure 3C:
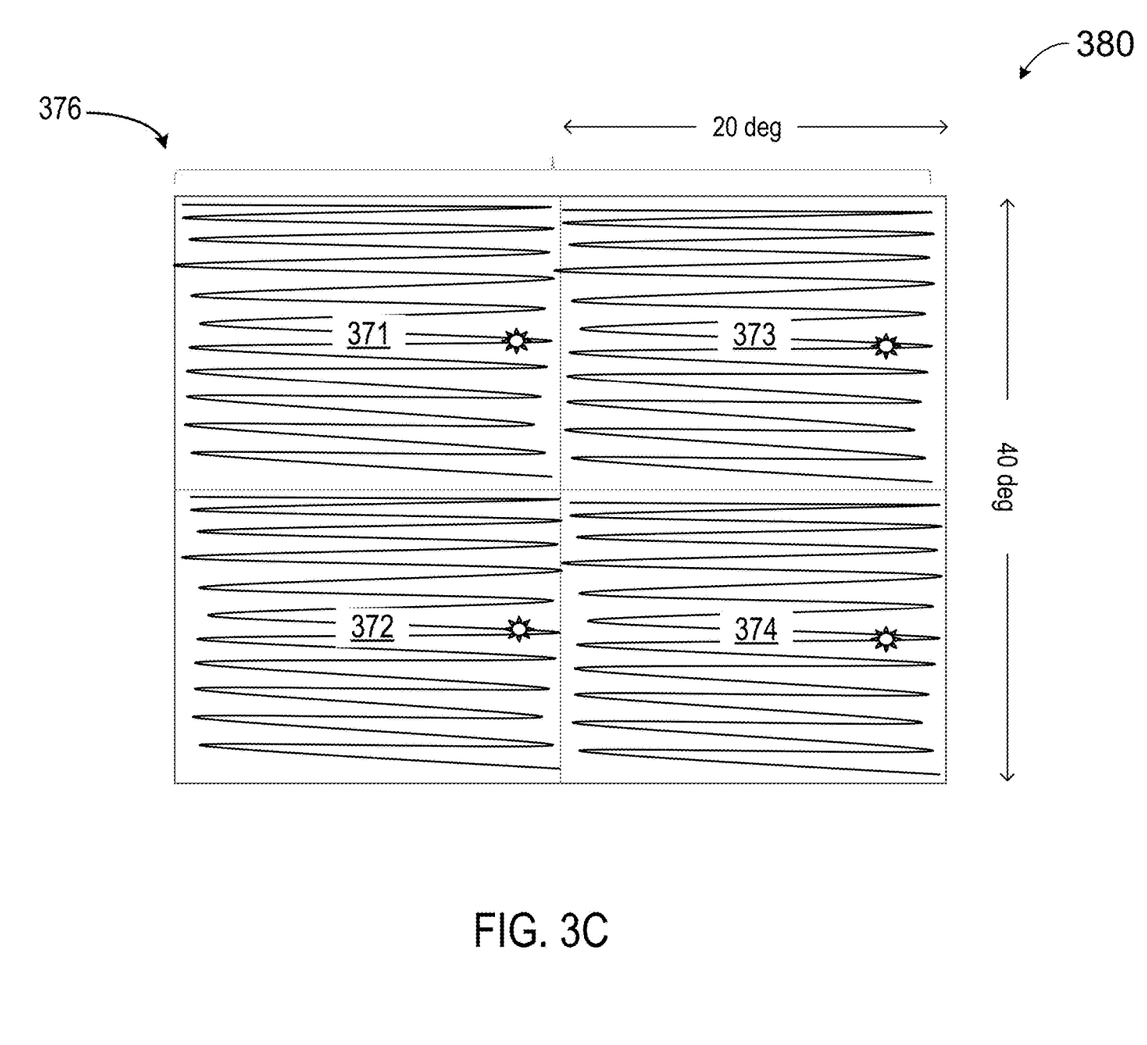
FIG. 3C is a simplified schematic diagram illustrating a composite field of view (FOV) according to some embodiments.

FIG. 3C is a simplified schematic diagram 380 illustrating a composite field of view (FOV) according to some embodiments. As described in FIGS. 3A and 3B, four diverging RGB cones of light can be incident on the scanning mirror. The mirror collimates them separately and outputs four collimated beams heading in different directions. With the mirror scanning, it can form images in the four quarters of the FOV. At any instant of time, each of the four collimated light beams is directed at a different angle. In this example, a full image is scanned concurrently (e.g., simultaneously) by four RGB beams in four quadrants of the field of view. The combination of the four scanning light beams is configured to provide a tiled image with four quadrants, 371-374, in an enlarged composite field of view 376 in FIG. 3C.

For example, in some embodiments, each quadrant can be a VGA (Video Graphics Array) image, but the total stitched image in the composite FOV can be full HD (High Definition) with an enlarged field of view. With reference to FIG. 3B, MEMS reflector/scanning mirror 350 may have a 20×20 degree optical scan range (corresponding to a 10×10 mechanical scan range). Diagonally opposite pairs of the output ports (e.g., 344A and 344C; and 344B and 344D) are angularly separated by 20 degrees angle theta θ (VGA resolution) as judged from the center of the scanning mirror 350. The uncollimated light beams (only 345A and 345D are visible in FIG. 3B) from the output ports 344A-344D of optical waveguide chip 340 reach scanning mirror 350. Each of the uncollimated light beams can have a different chief ray direction. The scanning mirror 350 has a surface with positive optical power positioned to collimate the uncollimated light beams and reflect collimated light beams (only 346A and 346D are visible in FIG. 3B) to ICG 321. ICG 321 is configured to incouple collimated light beams 346A and 346D into eyepiece waveguide 322. After total internal reflection in the eyepiece waveguide 322, each of the collimated light beams 348A and 348D exits the eyepiece waveguide 322 and forms a scanned image in a respective field of view.

For example, in some embodiments, image display system 300, with four input light beams, can provide a resulting scan image with 2X field of view (40×40 degrees) and resolution, commensurate with an HD, 40×40 degree requirement, for example, a pixel angular subtense of less than 1 arc minutes. Moreover, the final image can have 50 degrees diagonal for full HD display.

In the examples described above, a single ICG can receive multiple light beams having different directions to form a large field of view. For color displays, different ICGs can be used for different colors. As an example, an ICG can have a size on the order of 1 mm by 1 mm in an eyepiece waveguide having a size of a few centimeters. An integrated waveguide chip may have a size of about 2 mm by 2 mm.

In some embodiments, waveguide display 300 can be used with fewer or more than four point light sources described above and a scanning mirror with positive optical power for image generation with a larger composite field of view. Different composite FOV can be formed using different numbers and/or shapes of component FOVs. Moreover, waveguide display 300 can be used with a single point light source and a scanning mirror with positive optical power for image generation.

Figure 4:
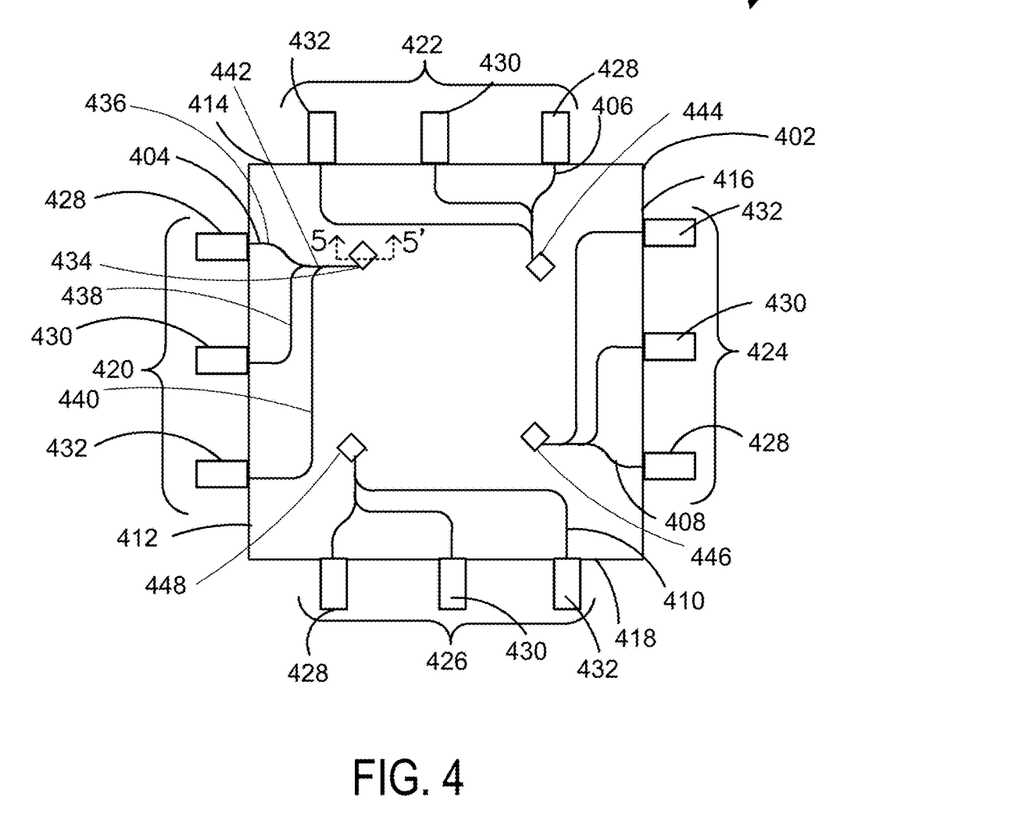
FIG. 4 is a top view of a four RGB channel light engine according to an embodiment.
Figure 5:
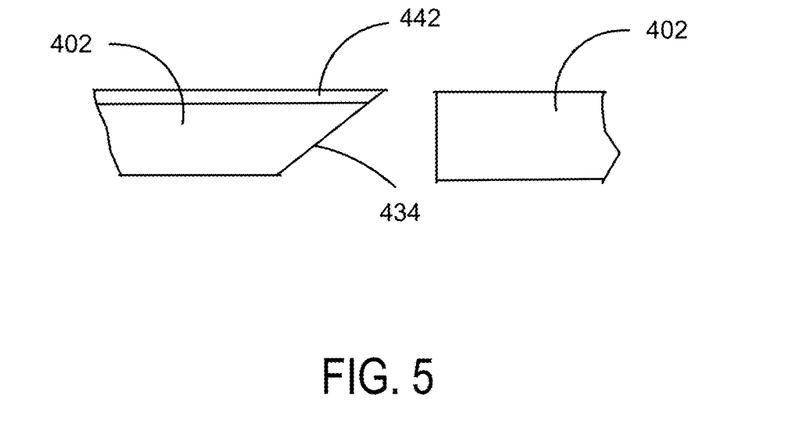
FIG. 5 is a fragmentary cross-sectional elevation view of a portion of the four RGB channel light engine shown in FIG. 4.

FIG. 4 is a top view of a four RGB channel light engine 400 according to an embodiment, and FIG. 5 is a fragmentary cross-sectional elevation view of a portion of the four RGB channel light engine 400 shown in FIG. 4. Light engine 400 is an example of the integrated optical waveguide chip 340 in FIGS. 3A and 3B. The light engine 400 can include a glass slab 402 in which a first branched waveguide 404, a second branched waveguide 406, a third branched waveguide 408 and a fourth branched waveguide 410 are defined.

As shown, the slab 402 can be square and includes a first side 412, a second side 414, a third side 416 and a fourth side 418. Alternatively shaped glass slabs 402 may also be used. A first set of red, green, and blue (RGB) laser diodes 420 is arranged along the first side 412, a second set of RGB laser diodes 422 is arranged along the second side 414, a third set of RGB laser diodes 424 is arranged along the third side 416 and a fourth set of RGB laser diodes 426 is arranged along the fourth side 418.

The first set of RGB laser diodes 420 includes a red laser diode 428, a green laser diode 430 and a blue laser diode 432. The first branched waveguide 404 is positioned adjacent to the first side 412 and serves to couple light from the first set of RGB laser diodes 420 to a first outcoupling facet 434. The first branched waveguide 404 includes a red light receiving branch 436 optically coupled to the red laser diode 428, a green light receiving branch 438 optically coupled to the green laser diode 430 and a blue light receiving branch 440 optically coupled to the blue laser diode 432. The red, green, and blue light receiving branches 436, 438, 440 connect (or alternatively are evanescently coupled) to a trunk 442 of the first branched waveguide 404. The trunk 442 extends to the first outcoupling facet 434. The outcoupling facet 434 is a total internal reflection (TIR) surface angled at 45 degrees relative to the orientation of the trunk 442. The first outcoupling facet 434 reflectively deflects light out of the plane of the glass slab 402. It is noted that the outcoupling facets are also referred to as output ports in the integrated optical waveguide chip 340 in FIGS. 3A and 3B.

The second, third and fourth branched waveguides 406, 408, 410 have the same structure as that of the first branched waveguide 404 as described but are rotated relative thereto to align with respective sides 414, 416, 418 adjacent to which they are positioned. The second, third and fourth branched waveguides 406, 408, and 410 respectively couple to a second outcoupling facet 444, a third outcoupling facet 446 and a fourth outcoupling facet 448. According to an alternative embodiment, laser diodes emitting at other wavelengths and associated light receiving branches can be added to the light engine 400 such that the light engine 400 will provide more than three (RGB) wavelength channels. For example, the additional channel could be infrared light that is useful in providing illumination for an eye tracking system.

FIG. 5 is a fragmentary sectional elevation view along cross section line 5-5' through outcoupling facet 434 in FIG. 4. FIG. 5 also shows the slab 402 and a trunk 442 of the first branched waveguide 404. The facet 434 is configured to reflect light upward out of the facet 434.

Figure 6:
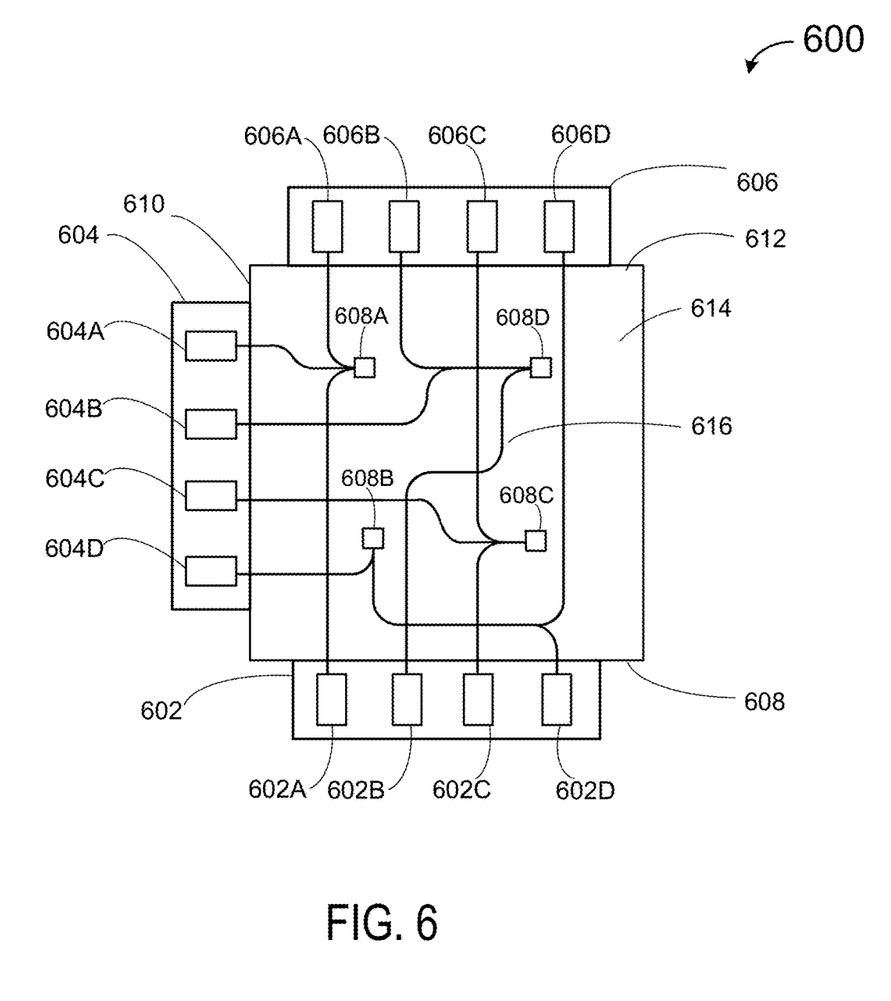
FIG. 6 is a top view of an integrated waveguide chip according to another embodiment.

FIG. 6 is a top view of an integrated waveguide chip 600 according to another embodiment. A red laser bar 602, a green laser bar 604 and a blue laser bar 606 are arranged, respectively, proximate a red input side 608, a green input side 610, and a blue input side 612 of glass slab 614 in which a network of waveguides 616 is formed. The red laser bar 602 includes four separately controllable red laser diodes 602A, 602B, 602C, and 602D. Similarly, the green laser bar 604 includes four separately controllable green laser diodes 604A, 604B, 604C, and 602D. Similarly, the blue laser bar 606 includes four separately controllable blue laser diodes 606A, 606B, 606C, and 606D. Four output facets 608A, 608B, 608C and 608D are defined in the glass slab 614. The output facets 608A, 608B, 608C and 608D have the same design as that of the output facet 434 shown in FIG. 5, or alternatively a different design. One of the separately controllable laser diodes from each of the laser bars 602, 604, 606 is coupled to each of the output facets 608A, 608B, 608C, and 608D through the network of waveguides 616. According to an alternative embodiment, another laser bar which may operate at a different wavelength (e.g., infrared) may be positioned along the fourth side of the glass slab 614 and optically coupled to the output facets 608A, 608B, 608C, and 608D via the network of waveguides 616 which may be extended for such purpose.

Figure 7A:
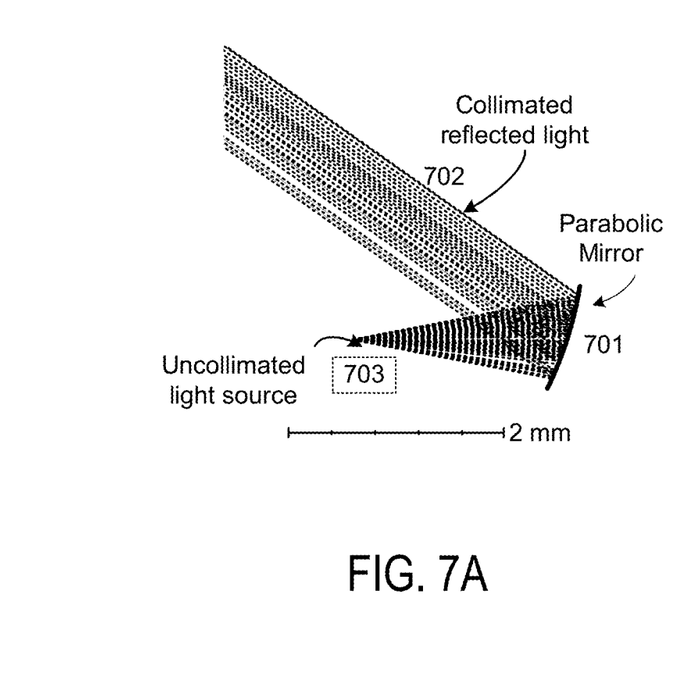
FIGS. 7A and 7B illustrate a scanning parabolic mirror providing collimated scanning reflected light beams from uncollimated incoming light sources according to some embodiments.
Figure 7B:
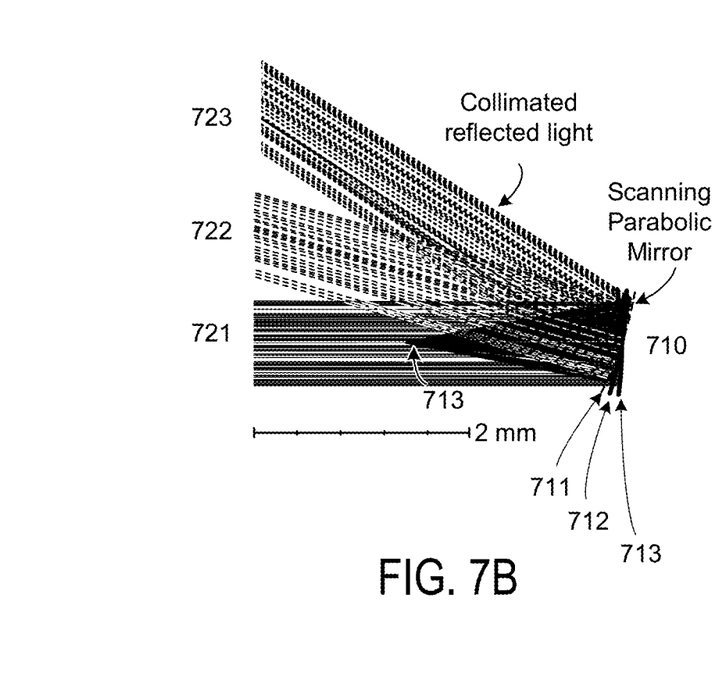

FIGS. 7A and 7B illustrate a scanning parabolic mirror providing collimated scanning reflected light beams from uncollimated incoming light sources according to some embodiments. FIG. 7A shows simulated light traces illustrating a parabolic mirror 701 providing collimated scanning reflected light beams 702 from an uncollimated incoming light source 703. FIG. 7B shows simulated light traces illustrating a scanning parabolic mirror 710 providing collimated scanning reflected light beams 721, 722, and 723 from uncollimated incoming light sources 713. Light beam 721 represents the reflected light beam with the scanning mirror 710 in a first position 711. Light beam 722 represents the reflected light beam with the scanning mirror 710 in a second position 712. Light beam 723 represents the reflected light beam with the scanning mirror 710 in a third position 713. As shown in FIG. 7B, as the scanning mirror rotates, the reflected light beams remain collimated. FIGS. 7A and 7B also show that the focal length of the mirrors in these examples is about 1.5 mm, which can enable a small package for augmented reality glasses.

Figure 8A:
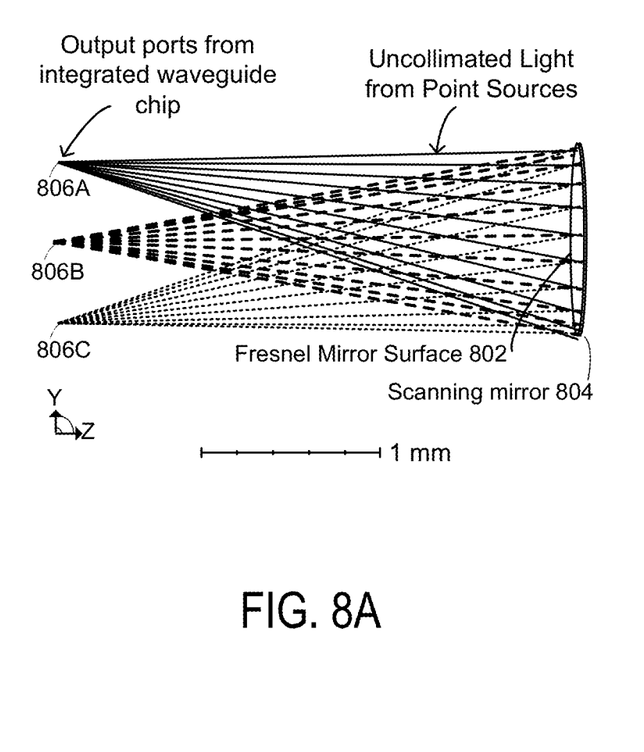
FIGS. 8A and 8B illustrate examples of light paths from three different output ports of an integrated optical waveguide chip incident upon a scanning Fresnel reflector according to some embodiments.
Figure 8B:
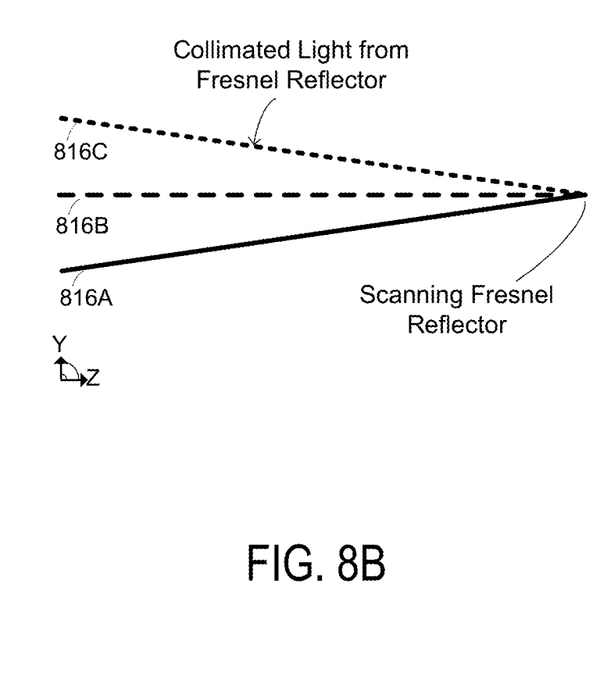

FIGS. 8A and 8B illustrate the results of ray trace analysis of collimation of light emitted from a multiport integrated optical waveguide chip (340, 400, not shown in FIGS. 8A-8B) by a Fresnel mirror surface 802 on a scanning mirror 804 according to certain embodiments. The scanning mirror 804 with the Fresnel mirror surface 802 is used in lieu of the parabolic scanning mirror surface 351 in FIGS. 3A and 3B according to certain embodiments. FIG. 8A illustrates light emitted by multiple ports of a multiport integrated optical waveguide chip and incident on the Fresnel mirror surface 802 of the scanning mirror 804. The positions of three ports are indicated by reference numerals 806A, 806B and 806C. The position of a fourth port, which is not visible in FIG. 8A, may be positioned behind the plane of the drawing sheet behind vertically centered position 806B. Note that the vertically centered positions 806B may, for example, be displaced perpendicularly outward from the plane of the drawing sheet relative to the lower position 806C and upper position 806A.

FIG. 8B illustrates that collimated light reflected by the Fresnel mirror surface 802 can remain collimated over a distance of about 100 mm. It should be noted that, in use, the light collimated by the Fresnel mirror surface 802 will only propagate a short distance before reaching the ICG 321. Note that FIG. 8A and FIG. 8B show two parts of the same light ray propagation paths. FIG. 8A shows first portions of the light ray propagation paths from the positions of the ports 806A, 806B, and 806C of the integrated optical waveguide chip (340 in FIGS. 3A and 3B, or 400 in FIG. 4) to the Fresnel mirror surface 802, and FIG. 8B shows second portions 816A, 816B, and 816C of the light ray propagation paths from the Fresnel Mirror surface 802 back in the direction of the ICG 321. Note that the ray paths in FIG. 8B are extended beyond the position of the ICG in order to illustrate the degree of collimation. In practice, the collimated light rays would be deflected at the ICG to angles above the critical angle for total internal reflection within the eyepiece waveguide 310. In use, the ICG would be positioned to the left of the positions of the three ports 806A, 806B, and 806C.

Figures 9A, 9B:
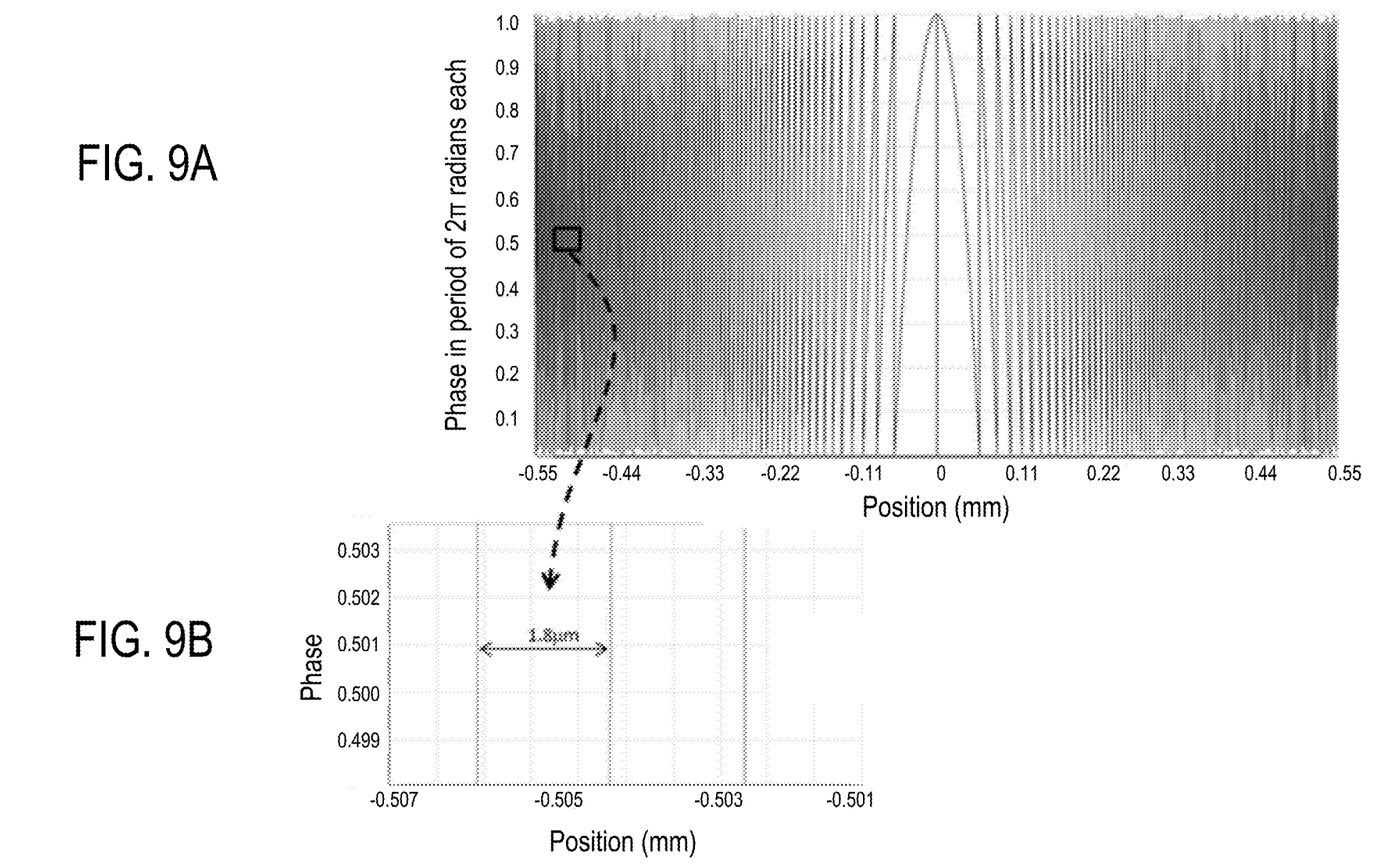
FIG. 9A is a plot of a simulated Fresnel lens pattern across the surface of a Fresnel lens.
FIG. 9B is a magnified view of a portion near the edge of the Fresnel lens of FIG. 9A.

FIG. 9A plots a Fresnel lens surface profile. The vertical axis shows the phase in period of a radians, and the horizontal length is the position in millimeters across the surface of a Fresnel lens on the order of millimeters suitable for AR or VR application. FIG. 9B is a magnified view of a portion near the edge of the Fresnel lens of FIG. 9A. As described above, a Fresnel lens can include multiple sections. FIG. 9B shows a period at the edge of the Fresnel mirror. The vertical axis shows the phase in period of a radians, and the horizontal length is the position in millimeters across the surface of the Fresnel lens. It can be seen that the smallest features on the Fresnel reflector needed to achieve the desired focal length can be about 1.8 um, which is within the capabilities of available fabrication technologies.

Figure 10:
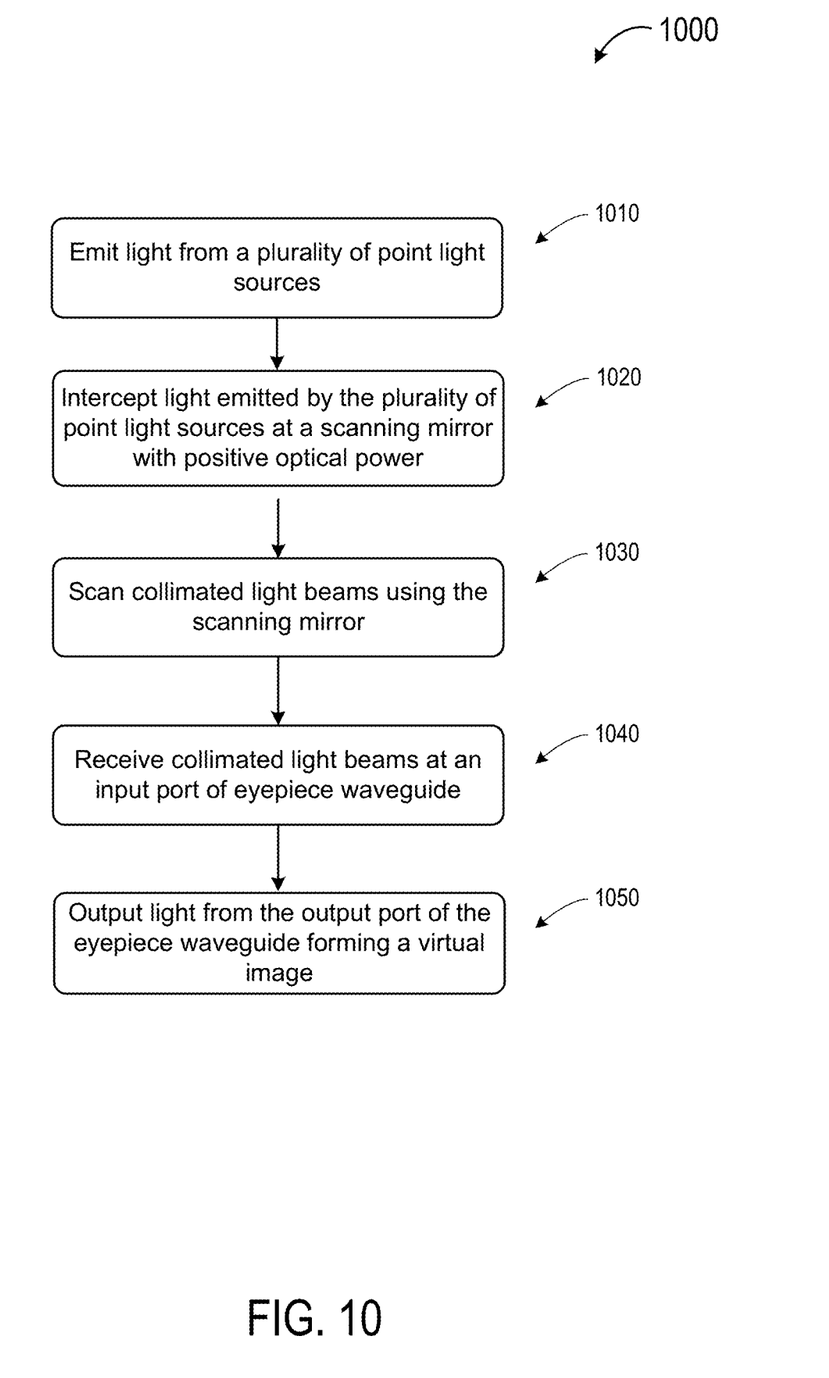
FIG. 10 is a flowchart illustrating a method for displaying an image in a waveguide display according to some embodiments.

FIG. 10 is a flowchart illustrating a method 1000 for displaying an image in a waveguide display according to some embodiments. As shown in FIG. 10, at 1010, the method 1000 for displaying an image in a waveguide display includes emitting light from a plurality of point light sources. The plurality of point light sources can include different light sources. For example, the plurality of point light sources can be provided in an integrated optical waveguide chip as described above in connection to FIGS. 3A-3C, 4-5, and 6. As shown in FIG. 3A, an integrated optical waveguide chip 340 can receive light from four sets of red, green, and blue (RGB) laser diodes 341A-341D. Integrated optical waveguide chip 340 can be made with a substrate of glass, semiconductor, or other material. Multiple optical waveguides can be formed in the substrate for guiding light from the laser diodes to output ports. The output ports can be formed by facets configured in the substrate. In this case, the output ports can function as point sources for emitting light out of the integrated optical waveguide chip.

In another example, as shown in FIG. 6, an integrated optical waveguide chip 640 has three laser diode bars attached to three sides of the chip: a red laser diode bar 671 with multiple red laser diodes, a green laser diode bar 672 with multiple green laser diodes, and a blue laser diode bar 673 with multiple blue laser diodes. Integrated optical waveguide chip 640 also has output ports 644 for providing output light. Similar to integrated optical waveguide chip 340 in FIG. 3A, integrated optical waveguide chip 640 can be made with a substrate of glass, semiconductor, or other material. The output ports can be formed by facets or outcoupling mirrors formed in the substrate, and can function as point sources for emitting light out of the integrated optical waveguide chip.

The light emitted from the point light sources can be uncollimated. For example, the light emitted from the point light sources forms a diverging pencil of light. Each of the plurality of point light sources can have a different emission direction corresponding to the center of the diverging pencil of light. The point light sources are configured to emit light toward a scanning mirror. As used herein, a point light source can refer to a light source that emits uncollimated (diverging) light.

At 1020, the method 1000 also includes intercepting light emitted by the plurality of point light sources at a scanning mirror having a surface with positive optical power. The surface with positive optical power is configured to collimate light emitted by the plurality of point light sources to produce a plurality of collimated light beams. Examples of a scanning mirror with positive optical power are described above in connection with FIGS. 3A-3C, 6, and 7A-9B. For example, as shown in FIG. 3A, the scanning mirror can be a two-dimensional (2-D) scanning mirror 350 having a surface with positive optical power, e.g., parabolic mirror surface 351 or a Fresnel reflector, positioned proximate the input port of the eyepiece waveguide 310. Scanning mirror 350 can be a two-dimensional scanning mirror, e.g., a parabolic mirror surface 351, mounted on a frame 352 with a pitch axis 353 and a roll axis 354. The mirror can be configured to rotate in the x and y directions, forming a 2-D scanner.

At 1030, the method 1000 includes scanning the collimated light beams using the scanning mirror. The scanning mirror is configured to collimate the uncollimated light from the light sources. The scanning mirror is configured to scan collimated light beams, thereby changing the angle of light incident on the input coupling element of an eyepiece waveguide for forming images.

At 1040, the method 1000 also includes receiving the plurality of collimated light beams from the scanning mirror in an input port of an eyepiece waveguide, and coupling collimated light out of an output port of the eyepiece waveguide, thereby forming a virtual image at some distance (e.g., ranging from infinity to a closer distance) from the user, at 1050. Examples of an eyepiece waveguide are described above in connection with FIGS. 3A and 3B. For example, eyepiece waveguide 310 can have an input coupling grating (ICG) 321, an orthogonal pupil expander (OPE) 322, and an exit pupil expander (EPE) 323. The input coupling grating (ICG), orthogonal pupil expander (OPE), and exit pupil expander (EPE) can take the form of gratings formed on the optical waveguide. Eyepiece waveguide 310 can have input ports, e.g., ICGs, configured to receive beams of light at differing angles from the scanning mirror. In some embodiments, the plurality of point light sources can be disposed in an integrated optical waveguide chip overlying the input port of the eyepiece waveguide, and the scanning mirror can be disposed overlying the integrated optical waveguide chip. In this configuration, the plurality of collimated light beams from the scanning mirror can be transmitted through the scanning mirror to the input port of the eyepiece waveguide.

As shown in FIG. 3B, the collimated light (only 346A and 346D are visible) from the scanning mirror is incoupled by the ICG 321 into eyepiece waveguide 310. Eyepiece waveguide 310 can have a stack of multiple optical waveguides for different colors. Incoupled light 348 propagates in eyepiece waveguide 310 by total internal reflection, and then outcoupled to orthogonal pupil expanders, and in turn coupled to exit pupil expanders (EPEs), which are not visible in FIG. 3B. The EPEs are configured to project images that can be viewed from the user eye positions 330.

In some embodiments, each of the plurality of collimated light beams is scanned through a portion of a composite field of view (FOV) and coupled through the eyepiece waveguide. As described in FIGS. 3A and 3B, four diverging incident RGB columns of light are incident on the scanning mirror. The mirror collimates them separately and outputs four collimated beams heading in different directions. With the mirror scanning, it can form images in the four quarters of the FOV. At any instant of time, each of the four collimated light beams is directed at a different angles. In this example, a full image is scanned by four RGB beams scanning in four quadrants of the field of view. The combination of the four scanning light beams is configured to provide a tiled image with four quadrants, 371-374, in an enlarged composite field of view 376 in FIG. 3C.

It should be appreciated that the specific steps illustrated in FIG. 10 provide a particular method of displaying an image in a waveguide display according to another embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

In the above example, four sets of scanning light beams are configured to provide a tiled image with four quadrants to form an enlarged composite field of view. In other embodiments, a different number of scanning light beams can be used to form an enlarged composite field of view of different sizes and shapes.

The image display systems described above may be operatively coupled, such as by a wired lead or wireless connectivity, to a data processing module, which may be mounted in a variety of configurations, such as fixedly attached to the frame, fixedly attached to a helmet or hat worn by the user, embedded in headphones, or otherwise attached to a user. The data processing module may include one or more processors configured to analyze and process data and/or image information. For example, image information for each portion of the composite field of view can be used to operate the light sources and the scanning mirror to control the display of images in the large composite field of view.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A waveguide display comprising:
an eyepiece waveguide including an input port configured to receive beams of light at differing angles;
an integrated optical waveguide chip overlying the input port of the eyepiece waveguide, the integrated optical waveguide chip including a plurality of point light sources positioned proximate the input port, each of the plurality of point light sources having an emission direction oriented away from the input port; and
a scanning mirror disposed overlying the integrated optical waveguide chip, the scanning mirror having a surface with positive optical power positioned proximate the input port and positioned to intercept light emitted by the plurality of point light sources, wherein the surface with positive optical power is configured to collimate light emitted by the plurality of point light sources to form a plurality of collimated light beams and reflect light emitted by the plurality of point light sources through the integrated optical waveguide chip to the input port.

2. The waveguide display according to claim 1 wherein the plurality of point light sources is positioned such that the scanning mirror scans multiple incoming light beams at the same time and combining individual fields of view illuminated by the plurality of point light sources into a larger composite field of view.

3. The waveguide display according to claim 1 wherein each of the plurality of collimated light beams is configured to illuminate a portion of a composite field of view (FOV) through the eyepiece waveguide.

4. The waveguide display according to claim 1 wherein the integrated optical waveguide chip that includes a plurality of optical waveguides, wherein at least a subset of the plurality of optical waveguides include light emission ends;
wherein the plurality of point light sources include the light emission ends.

5. The waveguide display according to claim 1 wherein the integrated optical waveguide chip is disposed between the scanning mirror and the input port.

6. The waveguide display according to claim 1 wherein the surface with positive optical power comprises at least one of a Fresnel reflector and a concave mirror.

7. The waveguide display according to claim 1 wherein the eyepiece waveguide further comprises an orthogonal pupil expander and an exit pupil expander, wherein the eyepiece waveguide includes at least one major surface, and wherein the input port, the orthogonal pupil expander, and the exit pupil expander comprise surface relief gratings disposed on the at least one major surface.

8. The waveguide display according to claim 7 wherein the integrated optical waveguide chip and the scanning mirror are disposed on a common side of the major surface.

9. Augmented reality glasses including the waveguide display recited in claim 1.

10. An image display system comprising:
an eyepiece waveguide including an input port configured to receive beams of light at differing angles;
a plurality of light sources configured to emit uncollimated light; and
a scanning mirror configured to rotate in pitch and roll directions, the scanning mirror having a surface with positive optical power configured to receive light emitted by the plurality of light sources, wherein the surface with positive optical power is configured to collimate light emitted by the plurality of light sources to form a plurality of collimated light beams and direct the plurality of collimated light beams to the input port.

11. The image display system according to claim 10 where the surface with positive optical power comprises a concave mirror.

12. The image display system according to claim 10 where the surface with positive optical power comprises a Fresnel reflector.

13. The image display system according to claim 10 further comprising:
an integrated optical waveguide chip that includes a plurality of optical waveguides, wherein at least a subset of the plurality of optical waveguides include light emission ends; and
wherein the plurality of light sources include the light emission ends.

14. The image display system according to claim 13 wherein the plurality of collimated light beams from the scanning mirror is transmitted through the integrated optical waveguide chip to reach the input port of the eyepiece waveguide.

15. The image display system according to claim 10, wherein the plurality of light sources is configured to emit uncollimated light in different directions.

16. The image display system according to claim 10 wherein each of the plurality of collimated light beams is configured to illuminate a portion of a tiled composite field of view (FOV) through the eyepiece waveguide.

17. A method for displaying an image in a waveguide display, comprising:
emitting light from a plurality of point light sources, each of the plurality of point light sources having a different emission direction;
intercepting light emitted by the plurality of point light sources at a scanning mirror configured to rotate in pitch and roll directions, the scanning mirror having a surface with positive optical power, wherein the surface with positive optical power is configured to collimate light emitted by the plurality of point light sources to produce a plurality of collimated light beams;
receiving the plurality of collimated light beams from the scanning mirror in an input port of an eyepiece waveguide; and
forming an image from an output port of the eyepiece waveguide.

18. The method according to claim 17 further comprising providing the plurality of point light sources from an integrated optical waveguide chip overlying the input port of the eyepiece waveguide, each of the plurality of point light sources having an emission direction oriented away from the input port.

19. The method according to claim 17 wherein each of the plurality of collimated light beams is configured to illuminate a portion of a composite field of view (FOV) through the eyepiece waveguide.

20. The method according to claim 17 further comprising the scanning mirror scanning multiple incoming light beams from the plurality of point light sources at the same time and combining individual fields of view illuminated by the plurality of point light sources into a larger tiled composite field of view.

* * * * *